United States Patent
Thomas et al.

(10) Patent No.: US 12,078,216 B2
(45) Date of Patent: Sep. 3, 2024

(54) DISC BRAKE

(71) Applicant: Meritor Heavy Vehicle Braking Systems (UK) Limited, Cwmbran Gwent (GB)

(72) Inventors: Paul Thomas, Cwmbran Gwent (GB); Anthony Williams, Cwmbran Gwent (GB); Matthew McGinn, Cwmbran Gwent (GB)

(73) Assignee: Meritor Heavy Vehicle Braking Systems (UK) Limited, Cwmbran Gwent (GB)

( * ) Notice: Subject to any disclaimer, the term of this patent is extended or adjusted under 35 U.S.C. 154(b) by 1021 days.

(21) Appl. No.: 16/986,398

(22) Filed: Aug. 6, 2020

(65) Prior Publication Data

US 2021/0048077 A1    Feb. 18, 2021

(30) Foreign Application Priority Data

Aug. 13, 2019  (EP) .................................... 19191566

(51) Int. Cl.
*F16D 55/226*    (2006.01)
*B60B 27/00*    (2006.01)
(Continued)

(52) U.S. Cl.
CPC ........ *F16D 55/226* (2013.01); *B60B 27/0052* (2013.01); *B60B 37/10* (2013.01); *B60T 1/065* (2013.01); *F16D 65/092* (2013.01); *F16D 65/123* (2013.01); *F16D 65/18* (2013.01); *F16D 65/38* (2013.01); *B60B 2320/10* (2013.01);
(Continued)

(58) Field of Classification Search
CPC .... F16D 55/226; F16D 65/092; F16D 65/123; F16D 65/18; F16D 65/38; F16D 2055/0016; F16D 2065/1308; F16D 2121/02; B60B 27/0052; B60B 37/10; B60B 2320/10; B60B 2900/111; B60B 2900/311; B60B 2900/351; B60B 2900/531; B60B 2900/541; B60T 1/065
See application file for complete search history.

(56) References Cited

U.S. PATENT DOCUMENTS 7,493,993 B2    2/2009  Pettersson
8,960,381 B2*   2/2015  Plantan ................. F16D 65/092
                                                    188/73.31
(Continued)

FOREIGN PATENT DOCUMENTS

CN      1932323 A    3/2007
CN    105822701 A    8/2016
(Continued)

OTHER PUBLICATIONS

Chinese Office Action dated Dec. 3, 2021 for corresponding Chinese Application No. 202010751248.7; 5 pages.
(Continued)

*Primary Examiner* — Thomas W Irvin
(74) *Attorney, Agent, or Firm* — Brooks Kushman PC

(57) ABSTRACT

A disc brake, an axle assembly having a disc brake, and a method of assembly. The disc brake may include a first friction element and a second friction element. The first and second friction elements may have an effective contact area with a brake rotor of at least 10,000 mm².

13 Claims, 9 Drawing Sheets

(51) Int. Cl.
B60B 37/10 (2006.01)
B60T 1/06 (2006.01)
F16D 65/092 (2006.01)
F16D 65/12 (2006.01)
F16D 65/18 (2006.01)
F16D 65/38 (2006.01)
B60T 13/24 (2006.01)
F16D 55/00 (2006.01)
F16D 65/02 (2006.01)
F16D 121/02 (2012.01)

(52) U.S. Cl.
CPC .... *B60B 2900/111* (2013.01); *B60B 2900/311* (2013.01); *B60B 2900/351* (2013.01); *B60B 2900/531* (2013.01); *B60B 2900/541* (2013.01); *B60T 13/24* (2013.01); *F16D 2055/0016* (2013.01); *F16D 2065/1308* (2013.01); *F16D 2121/02* (2013.01)

(56) References Cited

U.S. PATENT DOCUMENTS

| | | | | |
|---|---|---|---|---|
| 10,746,242 | B2* | 8/2020 | Shah | F16D 65/0068 |
| 10,801,569 | B2* | 10/2020 | McGinn | F16D 65/0068 |
| 10,927,911 | B2* | 2/2021 | Shah | F16D 55/2255 |
| 11,065,681 | B2* | 7/2021 | Thomas | B22C 9/10 |
| 11,408,474 | B2* | 8/2022 | Knoop | F16D 65/0068 |
| 2005/0284710 | A1 | 12/2005 | Roberts et al. | |
| 2014/0000991 | A1* | 1/2014 | Bull | F16D 65/092 |
| | | | | 188/72.1 |
| 2014/0027214 | A1* | 1/2014 | Morris | F16D 55/22 |
| | | | | 188/73.31 |
| 2016/0215834 | A1* | 7/2016 | Knoop | F16D 65/567 |
| 2016/0215835 | A1* | 7/2016 | Cleary | F16D 65/183 |
| 2018/0162369 | A1* | 6/2018 | Colavincenzo | F02N 11/003 |
| 2018/0347652 | A1* | 12/2018 | White | F16D 65/0056 |
| 2019/0162258 | A1* | 5/2019 | Shah | F16D 65/0068 |
| 2019/0329754 | A1* | 10/2019 | Raveendrappa | B60T 13/575 |
| 2021/0048080 | A1* | 2/2021 | Thomas | F16D 65/0087 |
| 2022/0299072 | A1* | 9/2022 | Thomas | F16D 55/227 |
| 2022/0314788 | A1* | 10/2022 | Dong | B60K 17/36 |

FOREIGN PATENT DOCUMENTS

| | | |
|---|---|---|
| EP | 2682631 A1 | 1/2014 |
| WO | 9927271 A1 | 6/1999 |
| WO | 2018222389 A1 | 12/2018 |

OTHER PUBLICATIONS

Extended European Search Report dated Jan. 27, 2020, for related European Appln. No. 19191566.9; 10 Pages.

\* cited by examiner

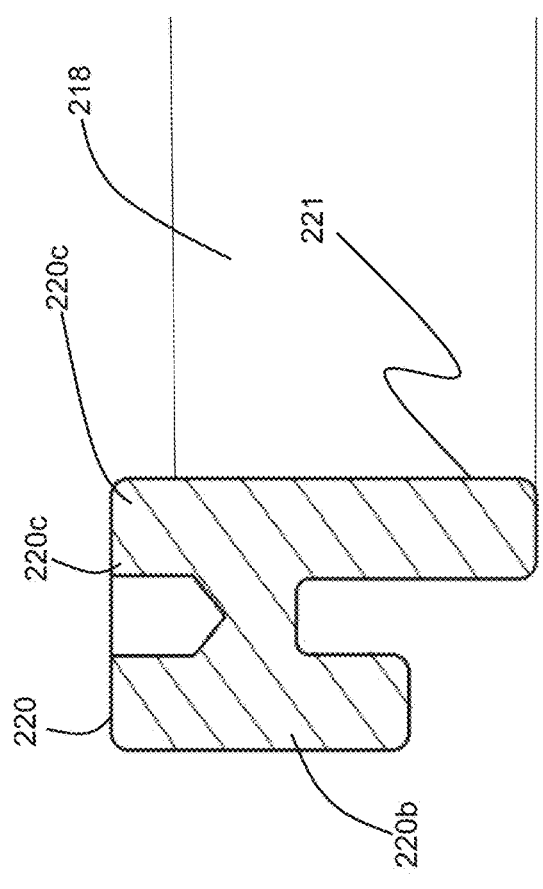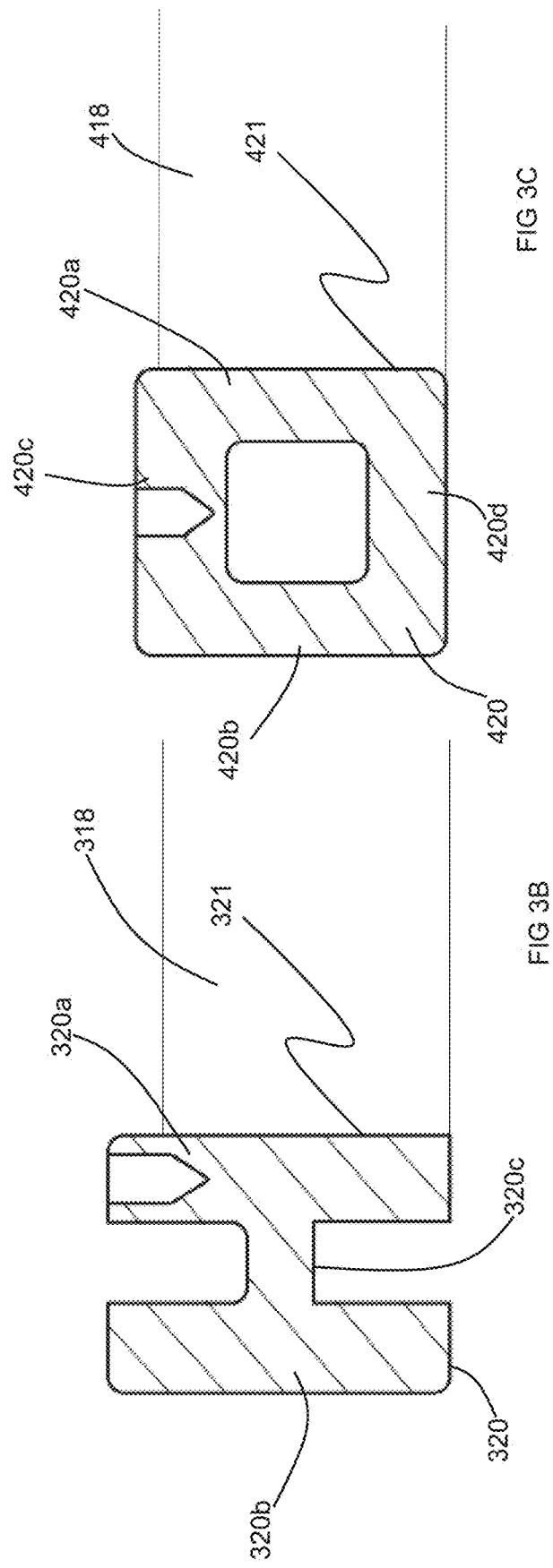

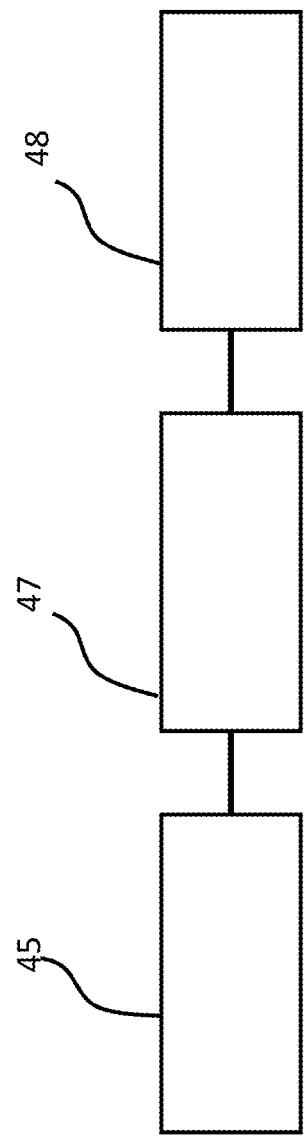

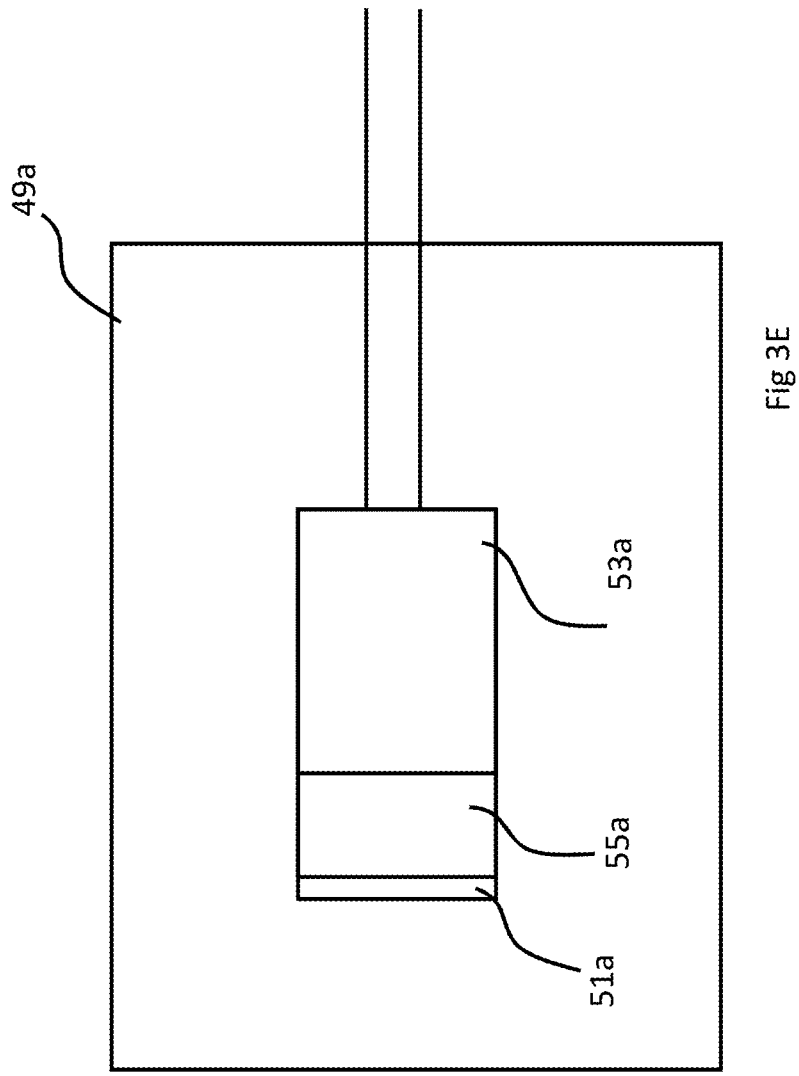

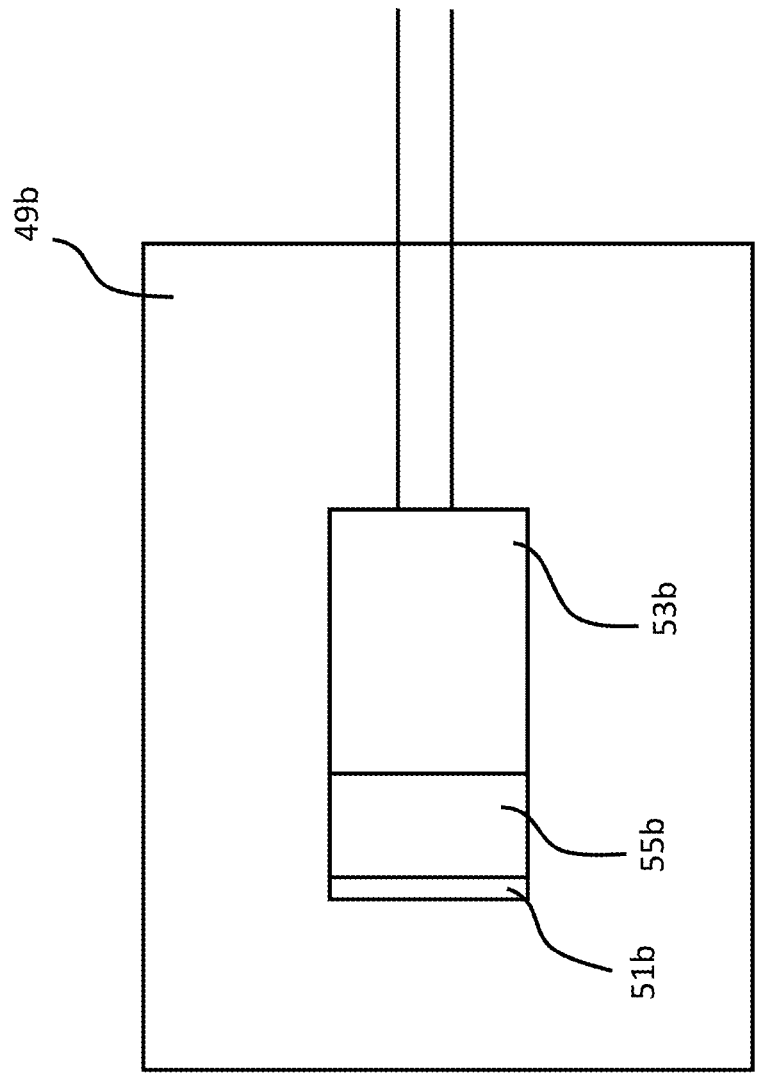

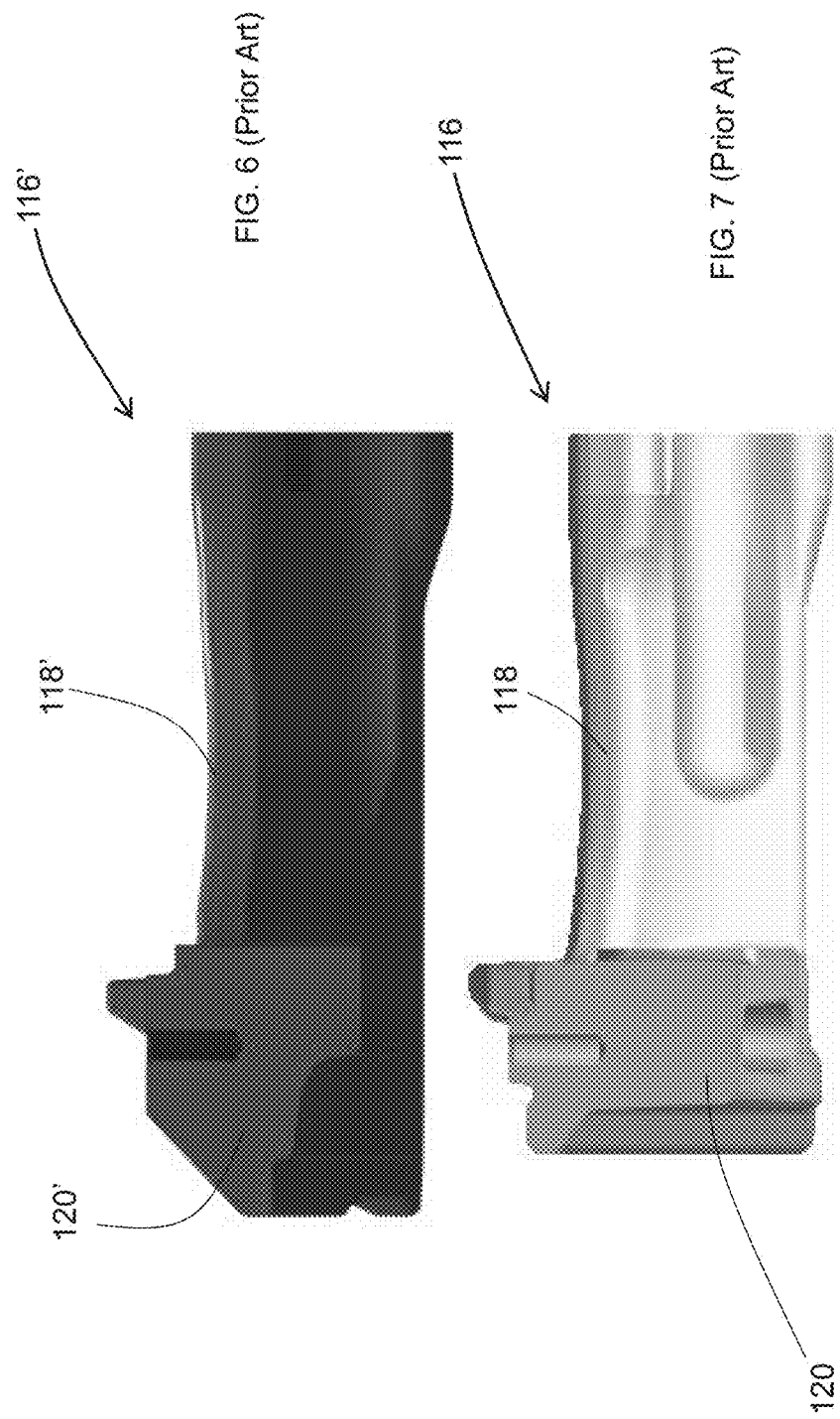

DISC BRAKE

TECHNICAL FIELD

The present teachings relate to a disc brake, to a vehicle axle assembly, and to a method of assembling a plurality of vehicle axle assemblies.

BACKGROUND

Disc brakes are commonly used for braking heavy vehicles such as trucks, buses and coaches.

Heavy vehicle disc brakes typically comprise a brake carrier, a brake caliper and a brake rotor. The brake carrier is arranged to carry brake pads on each side of the brake rotor. The brake caliper is mounted on the brake carrier and slidably supported by at least one guide assembly such that, when the disc brake is actuated, the brake caliper is able to slide along the guide assembly with respect to the brake carrier. As the brake caliper slides inboard, the brake pads are urged onto the opposing faces of the brake rotor in a clamping action and braking is achieved via their frictional contact.

Such disc brakes are typically mounted within a confined space at the end of a heavy vehicle axle, the space being defined by a wheel rim of a wheel secured at the end of the axle, a hub for mounting the wheel rim and the chassis/body of the vehicle inboard of the wheel.

Mounting of the disc brake is further complicated by the fact that different territories have different standard dimensions of wheel rims and/or so-called "pitch circle diameters" (PCDs) of the studs or bolts used to mount the wheel rim to the wheel hub. For example, the PCD is different for North American (NA) wheels and European Union (EU) wheels. As a result, to package the disc brake within these differing space envelopes, at least the outboard bridge part of the disc brake needs a different shape to fit and avoid fouling on the studs or rim.

This can be appreciated with reference to FIG. 5 of the accompanying drawings. FIG. 5 illustrates a bridge of a prior art disc brake for an EU market denoted by the reference numeral 116 and a bridge of a disc brake for the NA market denoted by reference numeral 116' superimposed on an EU standard 22.5" (572 mm) wheel rim 50 and wheel hub 52 with studs 54 having a pitch circle diameter of 335 mm. Both bridges 116 and 116' are in their most outboard position as they would be when the friction material of the brake pads and rotor are in an unused, unworn condition. In order to have a clearance to the wheel stud 54 it can be seen that the EU standard bridge 116 has a recess on an outboard face of the bridge that extends most of radial extent thereof, leaving a small radially outermost lip. By contrast, the NA bridge has a recess that has a lesser radial extent in order to accommodate a lesser PCD of 286 mm typically, and a greater chamfer between the outboard face and radially outer face of the housing. As illustrated by FIG. 5 it can be seen that this would result in the wheel studs colliding with the bridge 116' if an NA bridge was fitted to an EU wheel end. Although not illustrated if an EU bridge 116 were to be fitted to an NA wheel end, then the absence of the chamfer would cause the EU bridge to foul on the nave portion of the US wheel rim. In other words neither bridge is interchangeable with the other. Similar issues exist. In other territories that have other standard dimensions for PCD and wheel rim design, for example, each requiring a bespoke shape of bridge.

This increases the number of models of disc brake that need to be designed and manufactured. It may also increase the mass of the disc brakes, since a less optimal shape of bridge may need to be designed to fit within the space envelope and therefore more material is required to achieve the desired strength to withstand braking induced loads when in service.

The present teachings seek to overcome or at least mitigate the problems of the prior art.

SUMMARY

A first aspect of the teachings provides an air or electro-mechanically actuated disc brake for heavy vehicles, the disc brake comprising: a first friction element and a second friction element; a brake caliper including a housing and a bridge; the housing containing a wear adjustment mechanism and an actuator mechanism having a friction element contacting actuator output to drive the first friction element in a first axial direction; the bridge being configured to extend over a brake rotor in use and defining a support face to the second friction element in at least the first axial direction; wherein the maximum spacing between the actuator output and the support face is in a range of 75 mm to 50 mm, optionally wherein the first friction element and second friction element each have an effective contact area to the rotor of at least 10,000 mm$^2$.

Electrically powered and hybrid heavy vehicles are expected to utilise regenerative braking for the majority of routine braking operations in order to recover and conserve electrical energy as far as possible. As a consequence foundation brakes, such as disc brakes, are likely to be utilised to slow such vehicles primarily in emergency braking situations. The present applicant has recognised that this presents an opportunity to downsize certain aspects of such disc brakes, whilst maintaining the ability to supply the required brake torque in emergency stop scenarios. Specifically, a suitable service life of such brakes can be achieved with thinner pads and rotors. In turn, this means that the axial length of the disc brake is reduced, but whilst achieving the comparable clamp forces and brake torque. This allows a single housing to be used for a greater range of vehicle installations, for example for both EU and NA installations, allowing the number of housing variants to be reduced. Further, this may also increase the rigidity of the brake and/or enable its mass to be reduced directly and possibly indirectly as e.g., the second moment of area of the support portion may be reduced.

Optionally, the disc brake is rated to provide a brake torque in excess of 8 kNm.

Optionally, the disc brake comprises an opening in the bridge portion, the opening having an axial length at least as large as the maximum spacing between the actuator output and the support face.

Optionally, the disc brake opening has a circumferential width at least as wide as the brake pads so as to permit the fitting and removal of the first and/or the second friction element to and from the disc brake in a solely radial direction.

Advantageously, this allows for rapid inspection and replacement of brake pads without requiring the caliper to be removed from the vehicle.

Optionally, a pad retainer extends over the opening to hold the first and/or second friction elements in place.

By virtue of the narrower spacing, the pad retainer can be shorter and have a lower bending resistance than known retainers, thereby further reducing weight.

Optionally, the support has an I-section, C-section, angle section or box section profile.

Profiles of this shape may fit within the available space envelope and allow for the strength of the support to be maximised with low mass.

Optionally, the housing and bridge are formed monolithically as a monobloc from the same piece of material.

As the bridge may be standardised for a greater range of wheel installations, it becomes more attractive to produce Monobloc calipers.

Optionally, the disc brake further comprises a carrier having support surfaces to support the first friction element and second friction element in a circumferential and radially inward direction.

Optionally, the carrier has an axial length between the inboard extent of the support surface for the first friction element and the outboard extent of the surface for the second friction element of less than 100 mm.

Advantageously, this allows the carrier to be lighter and/or stiffer than those of the prior art.

Optionally, the disc brake further comprises an actuator, e.g., an air actuator, wherein the actuator has a maximum travel of less than 55 mm.

A lower travel than the prior art may be achieved due to thinner friction material on the friction elements having lower compressibility. In turn this may permit a more compact housing to be utilised, further reducing the size of the caliper and lowering mass.

Optionally, the disc brake further comprises a brake rotor, wherein the brake rotor is a solid, unventilated rotor.

A solid rotor may be thinner than a ventilated disc with the same wear life and acceptable rigidity. Since the disc brake is not expected to be operative for extended periods, ventilation is not required to maintain the rotor temperature within permissible limits.

A second aspect of the teaching provides a heavy vehicle axle assembly, the axle assembly comprising: a wheel rim; a wheel hub for mounting the wheel rim thereto; a brake rotor mounted to the wheel hub; an axle; a disc brake of the first aspect mounted to the axle.

Optionally, the hub has a first (e.g., North American) or second different (e.g., European Union) wheel hub configuration and the wheel rim is a first (e.g., North American) or second different (e.g., European Union) type and the disc brake does not foul on the wheel hub or wheel rim when the friction elements are unworn and the rotor is unworn.

By being able to fit within two different types of hub stud pattern and wheel rim, such as North American or European Union types in the most extreme case of unworn friction elements and unworn rotor, the disc brake can be standardised for both types and the number of models of brake may be minimised.

A third aspect of the teachings provides a method of assembling a plurality of axle assemblies of the second aspect of the teachings, at least one being of a first (e.g., North American) wheel hub configuration and at least one of a second different (e.g., European Union) wheel hub configuration, the method comprising the steps of: providing a plurality of the disc brakes; fitting the disc brakes to the axles irrespective of whether the wheel hub has the first wheel hub configuration or the second wheel hub configuration; and mounting and securing a first (e.g., North American) rim or second different (e.g., European Union) rim to the axle assembly dependent upon whether the wheel hub has the first configuration or the second configuration.

A fourth aspect of the teachings provides a heavy vehicle comprising a drivetrain powered at least in part by an electric motor supplied with electrical energy from an electrical energy storage device, the heavy vehicle further comprising an axle assembly according to the second aspect of the teachings.

BRIEF DESCRIPTION OF THE DRAWINGS

For a better understanding of the present teachings and to show how they may be carried into effect, reference will now be made by way of example only, to the accompanying drawings, in which:

FIGS. 3A, 3B and 3C are radial cross sections through various profiles of bridge according to the present teachings;

FIG. 3D is a schematic view of an axle assembly according to the present teachings;

FIG. 3E is a schematic view of a first wheel hub configuration according to the present teachings;

FIG. 3F is a schematic view of a second wheel hub configuration according to the present teachings;

FIGS. 6 and 7 are cross-sections through prior art North American and European bridges respectively.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

With reference to FIGS. 1 to 4, a disc brake according to the present teachings is indicated generally at 1. The disc brake is of a type intended to be used with heavy vehicles such as trucks (including trailers) for the carriage of goods, e.g., with a maximum laden weight in excess of 3.5 tonnes, or 7.5 tonnes or 11 tonnes, or buses and coaches for the carriage of 17 or more people, more typically in excess of 20 people. In particular, but not exclusively the disc brake is intended for use with such vehicles that are powered wholly or partially from a source of electrical energy or electrical energy storage device 45, such as a battery, which supplies the energy to an electrical machine or electric motor 47 that is operable as a motor to provide vehicle propulsion, and as a generator that can provide regenerative braking for the vehicle.

Various orientations of the disc brake are described. In particular the directions inboard I and outboard O refer to the typical orientation of the disc brake when fitted to a vehicle and with reference to the longitudinal centre line of the vehicle. The radial direction R refers to an orientation with reference to the centre of the rotor (axis A-A) and is for example the direction in which friction elements (brake pads) may be fitted and removed from the disc brake. The circumferential direction C refers to a tangent to the direction of the rotation of the rotor and is for example the direction in which a friction induced load from a brake pad is laterally transmitted into an abutment of a brake carrier.

Figure 1:
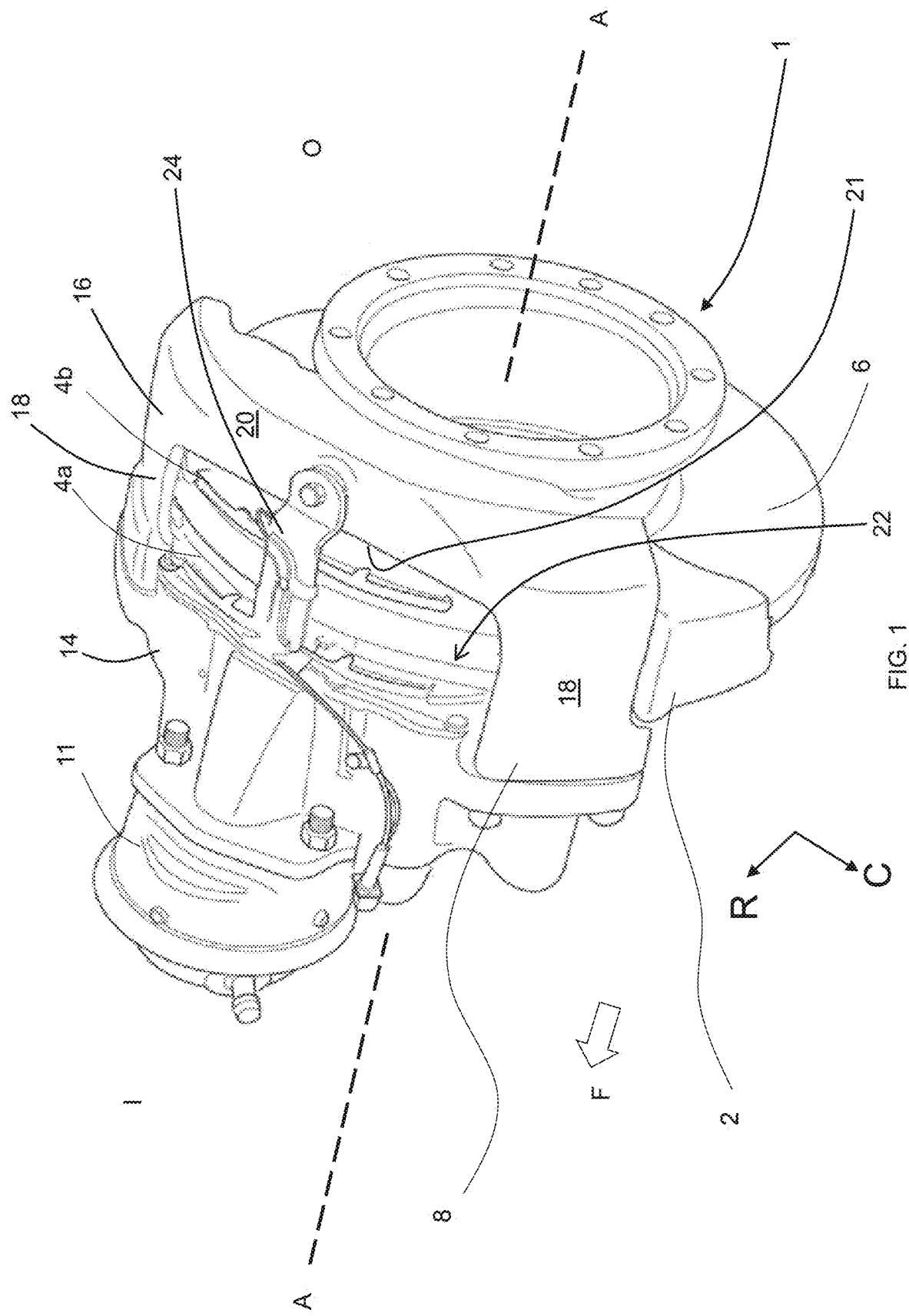
FIG. 1 is an isometric view of a disc brake according to the present teachings.
Figure 2:
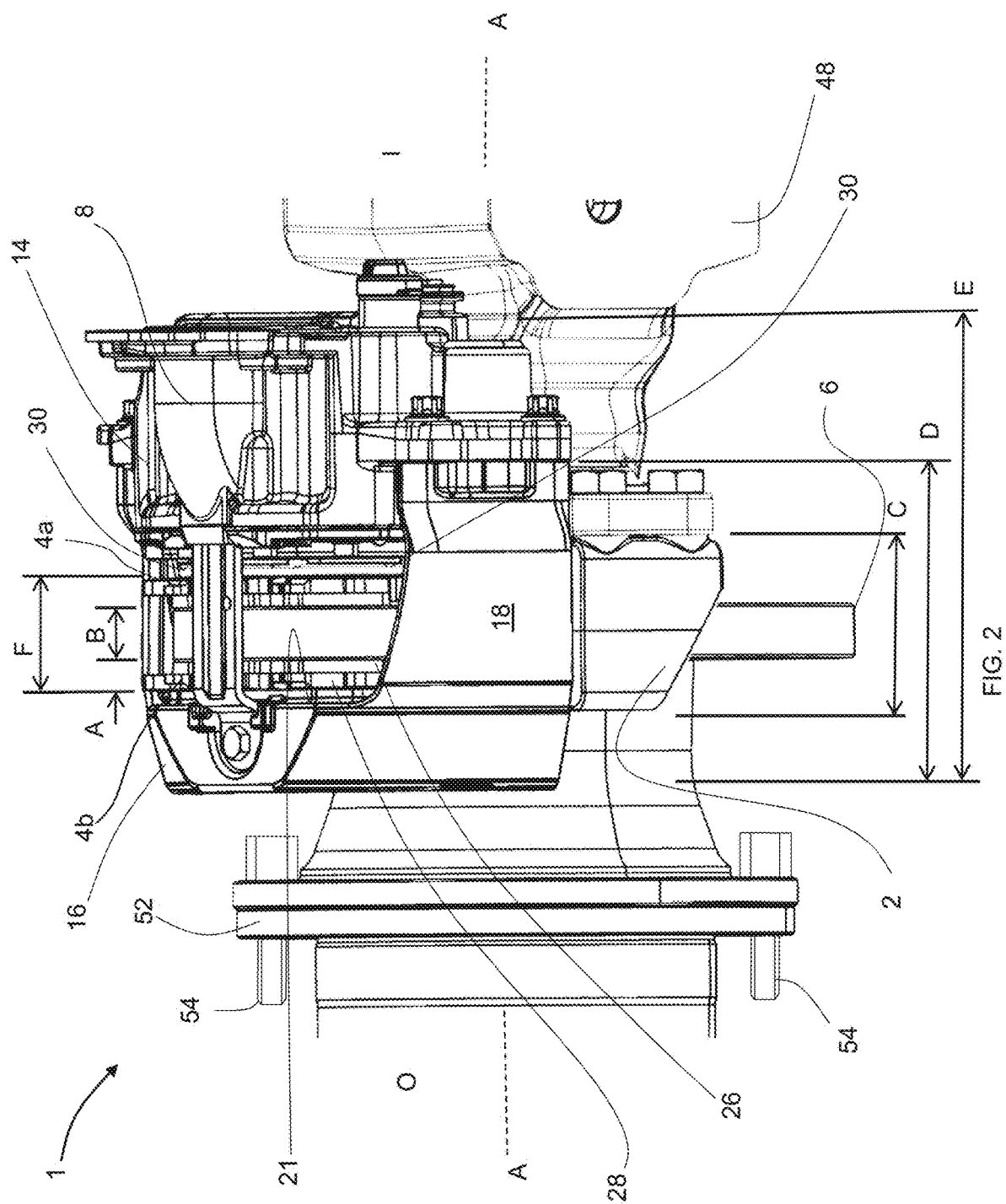
FIG. 2 is a side view of the disc brake of FIG. 1 when mounted to a vehicle axle.

With reference to FIGS. 1 and 2, the disc brake 1 comprises a brake carrier 2. The brake carrier 2 carries a first friction element (an inboard brake pad) 4a and a second friction element (an outboard brake pad) 4b. A brake rotor 6 is positioned between the brake pads and is rotatable about the axis A-A. A brake caliper 8 is slidably mounted with respect to the brake carrier by at least one guide assembly (not visible).

The disc brake 1 further comprises an air actuator 11 for moving the inboard brake pad 4a into frictional contact with the brake rotor 6 when the disc brake is actuated via a suitable mechanism (not shown) located within the caliper housing 14. When the inboard brake pad 4a is pushed by the actuator 11 into contact with the rotor 6, a reaction force F drives the brake caliper 8 to slide inboard relative to the brake carrier 2. As the brake caliper 8 slides inboard, it moves the outboard brake pad 4b towards the brake rotor 6. Hence, the brake rotor 6 becomes clamped between the inboard and outboard brake pads 4a, 4b and the rotation of the brake rotor is frictionally inhibited.

In this embodiment the inboard and outboard brake pads 4a and 4b are identical and each comprises a layer of friction material 26 that is intended to face the brake rotor 6 in use. The friction material 26 is bonded to and supported by a backplate 28 formed from a cast or stamped piece of metal such as steel that typically has a thickness in excess of 6 mm, but more typically 8-10 mm and is therefore resistant to deformation under the high loads are that induced on the brake pads 4a and 4b during a braking operation. Typically, for heavy vehicle disc brakes each brake is capable of applying a braking torque in excess of 8 kNm for 17.5" brakes up to in excess of 20 kNm for 22.5" brakes, being notably higher than for light passenger vehicles. This is a function of the clamp forces and contact area between the brake pads 4a, 4b and the rotor. Typically each brake pad has a contact area in excess of 10,000 mm$^2$ for 17.5" brakes, i.e., greater than 20,000 mm$^2$ per brake, again significantly higher than for light passenger vehicles. 19.5" brakes typically have pads with contact areas in excess of 16,000 mm$^2$ and 22.5" in excess of 20,000 mm$^2$.

The brake caliper 8 comprises a housing 14 and a bridge 16. In this embodiment the housing 14 and bridge 16 are separate components that are bolted together. In other embodiments they may be monolithically/integrally formed as a single component, often referred to as a monobloc caliper.

As the disc brake 1 undertakes multiple braking operations, the friction material is worn away, as are the corresponding faces of the brake rotor 6 to a lesser extent. A wear adjustment mechanism (not visible) located within the housing 14 incrementally advances the inboard brake pad 4a towards the rotor 6 in order to maintain a suitable running clearance (i.e., the air gap between the brake pads 4a and 4b and the rotor) between the brake pads 4a, 4b and the brake rotor. It will be appreciated that wear of the outboard brake pad 4b thus causes the entire brake caliper 8 to move inboard in order to maintain this running clearance.

The bridge 16 is formed in a U-shape in plan view with two arms 18 that extend over the rotor 6 and are connected by a circumferentially extending support portion 20. The support portion has an inboard face 21 that is substantially planar and arranged to support an outboard face of the outboard brake pad 4b and move the outboard brake pad 4b into contact with the brake rotor 6 during the braking operation as described above.

In this embodiment the arms 18, together with the support portion 20, define a radial aperture 22 in the bridge portion 16. A pad retainer 24 extends axially across the radial aperture 22 and is releasably secured in order to restrain the inboard and outboard brake pads 4a and 4b from being removed in a radial direction. The pad retainer 24 may however be removed. In this embodiment the aperture 22 is dimensioned such that when the retainer is removed, the inboard and outboard brake pads 4a and 4b may be removed radially outwardly for inspection or replacement. This arrangement is advantageous since it avoids the need for the entire caliper 8 to be dismounted from the carrier 2 in order to replace the brake pads 4a and 4b.

Although not visible in FIGS. 1 and 2, the brake carrier 2 is provided with radially extending abutments to inhibit circumferential movement of the inboard and outboard brake pads 4a and 4b e.g., during a braking operation. The carrier 2 further comprises circumferentially extending abutments to support the inboard and outboard brake pads 4a and 4b in a radially inward direction such that together with the pad retainer 24 the brake pads are in operation restrained from movement in all radial and circumferential directions. In other embodiments the outboard brake pad may instead be supported on the caliper circumferentially and radially inwardly.

Figure 5:
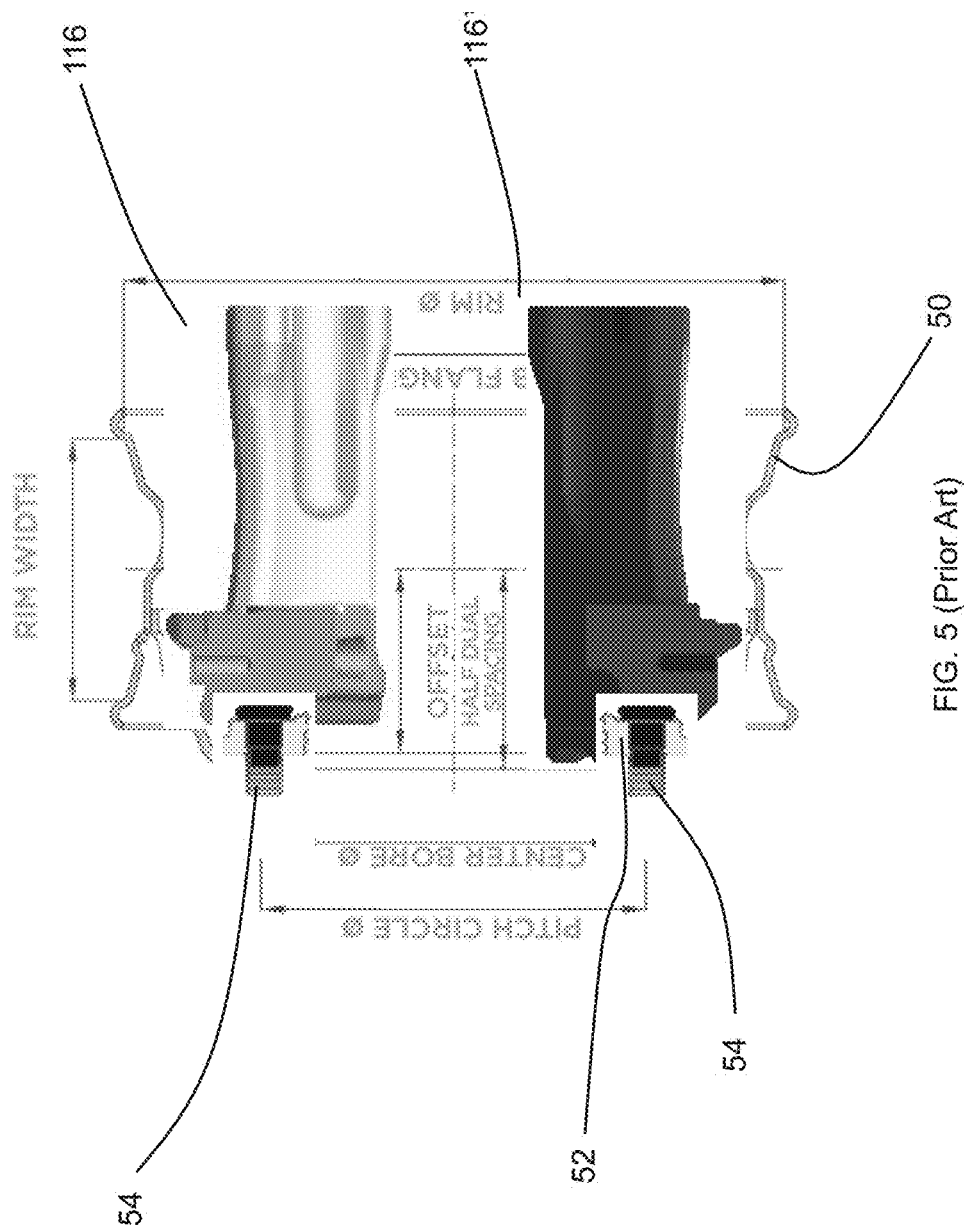
FIG. 5 is a vertical cross-section through a prior art wheel hub, wheel rim and bridges.

FIG. 2 depicts the disc brake 1 being mounted to a heavy vehicle axle 48. The axle comprises a wheel hub 52 which is rotatable with respect to the remainder of the axle and has the brake rotor mounted thereto. The axle 48 may be a driven axle, in which case a drive shaft (not visible) is connected to the hub 52, or the hub may freewheel if undriven. The hub further comprises a plurality of studs 54 mounted thereto (typically ten) to which a wheel rim (similar to the rim 50 of FIG. 5) is mounted and releasably secured by nuts (not shown).

FIG. 2 further depicts the disc brake 1 of an embodiment of the present teachings in a fully unworn condition. That is the inboard and outboard brake pads 4a and 4b have not yet experienced any wear due to friction generated under braking, and nor has either face of the brake rotor 6 been contacted by the inboard and outboard brake pads 4a, 4b and experienced any wear either.

It can be further seen in FIG. 2 that the inboard brake pad 4a is in contact with the outboard faces of heads of two pistons 30 that define the ultimate output of the mechanism within the caliper housing 14 that transmits and amplifies the force from the actuator 11 and applies it to the inboard brake pad 4a. In other embodiments a single or more than two pistons may be utilised and/or a plate may be interposed between the piston(s) and inboard brake pad to spread the force from the mechanism across the brake pad more evenly. Such plates may be integral with or separate from the piston(s) themselves.

As depicted in FIG. 2 the spacing between the outboard face of these pistons 30 and the inboard face 21 of the support portion 20 is at its maximum operating spacing. This spacing has to be sufficient to accommodate the axial thickness of the inboard and outboard brake pads 4a and 4b, the axial thickness of the brake rotor 6 and a desired level of running clearance that avoids or minimises drag being generated by the brake pads 4a and 4b when the brake is not applied.

In this embodiment each brake pad has a thickness of 16 mm (9 mm backplate 28, 7 mm friction material 26), the brake rotor 6 has a thickness of 30 mm and a nominal air gap of 1 mm in total results in a maximum spacing of 63 mm. This spacing is denoted by dimension F of FIG. 2. The thickness of each brake pad 4a and 4b is denoted by dimension A and the thickness of the brake rotor 6 is denoted by dimension B. It can be seen that in this embodiment the brake rotor 6 is solid rather than ventilated. As the disc brake is only expected to be utilised intermittently, ventilation is not require to maintain the rotor temperature within acceptable limits. This enables the rotor 6 to be thinner whilst having an acceptable level of rigidity and durability.

FIG. 2 also shows the Mowing dimensions; C is the axial length of the brake carrier 2. D is the axial length of the bridge 16. E is the axial length of the caliper from the outboard face of the bridge 16 to the inboard face where the actuator 11 mounts to the caliper 8.

Figure 4:
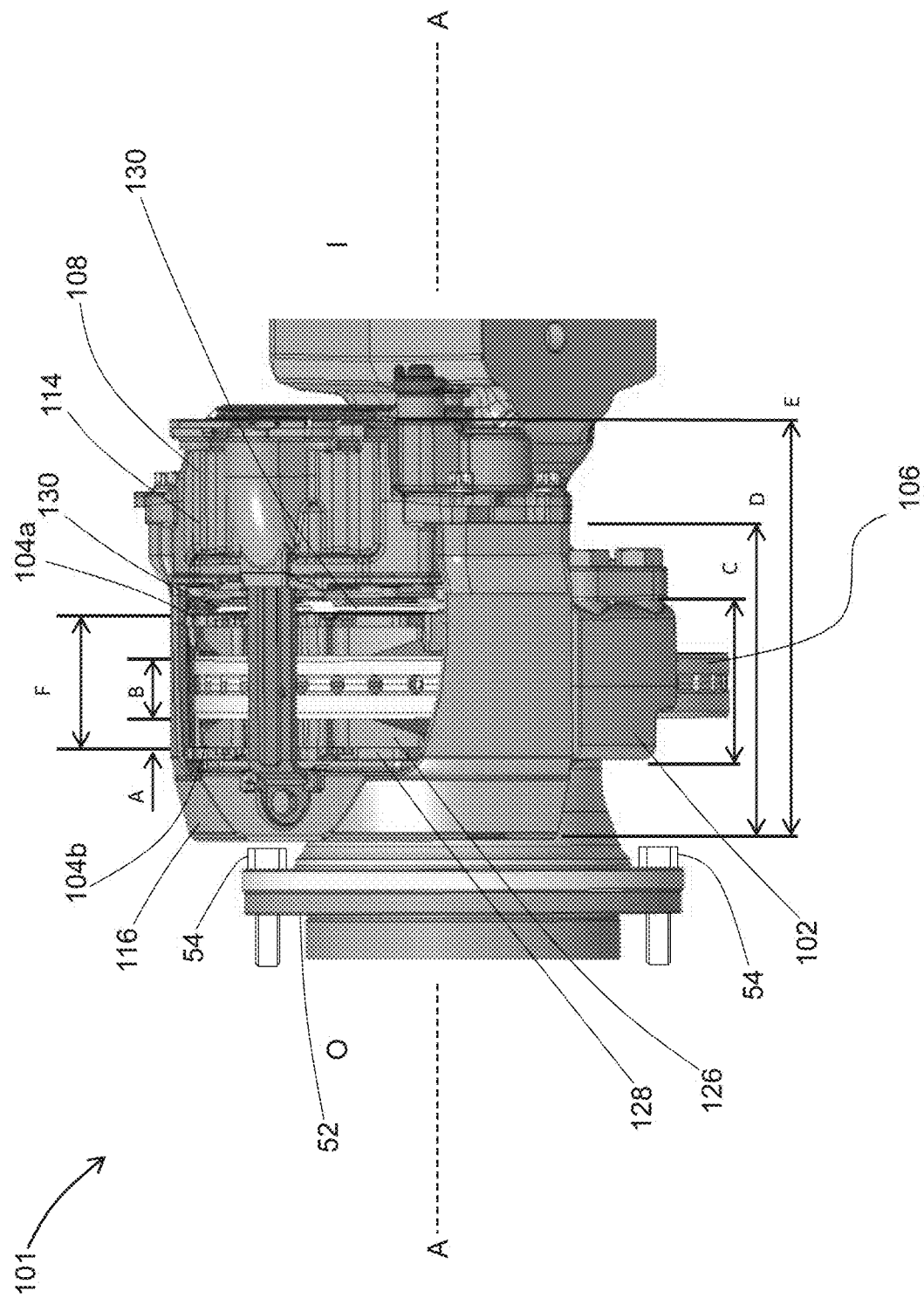
FIG. 4 is a side view of a prior art disc brake mounted to an axle.

FIG. 4 shows an equivalent view of a prior art disc brake to that of FIG. 2. In FIG. 4 the equivalent parts are labelled by equivalent reference numerals but 100 greater. FIG. 4 also includes arrows showing the equivalent dimensions A to F. The table below is a comparison of the dimensions of the brake of the present teachings of FIG. 2 with those of the prior art brake shown in FIG. 4.

| | Description | Prior Art Brake (mm) | Present Brake (mm) | Delta (mm) |
|---|---|---|---|---|
| A | Pad assembly thickness | 29 | 16 | −13 |
| B | Rotor thickness | 45 | 30 | −15 |
| C | Carrier length | 111 | 96 | −15 |
| D | Bridge length | 222 | 181 | −41 |
| E | Bridge to caliper mounting face | 296 | 255 | −41 |
| F | Actuator output to support face | 104 | 63 | −41 | it can be seen from this comparison that the overall length of the disc brake of the present teachings is 41 mm less than that of the equivalent prior art disc brake, and further that this reduced length has been entirely achieved by reducing the length of the bridge portion 116 which in turn is achievable because the rotor thickness has been reduced by 15 mm and the thickness of both the inboard and outboard brake pads has been reduced by 13 mm.

Further, it can be seen that with the axial centre line of the rotor 6 being in the same position in FIGS. 2 and 4, this change in dimension means that the outboard end face of the bridge 16 has shifted 20.5 mm inboard from the disc brake 101 shown in FIG. 4. This change in position results in the outboard face of the bridge 16 having a greater axial clearance to the wheel studs used to mount the wheel rim to the axle. In addition, it results in the radially outer face of the bridge 16 having a greater clearance to a nave portion of the wheel rim that curves around from the wheel studs to connect to an outer rim portion of the wheel rim. As such, this enables a single profile of bridge 16 to be interchangeable with multiple wheel stud layouts and wheel rim profiles, for example, interchangeable between North American and European Union stud layouts and wheel rim profiles. If required, further outboard clearance can be achieved by moving the rotor 6 centreline further inboard. This can be done without necessarily resulting in the inboard end of the caliper 8 being any further inboard when the pads and rotor are fully worn than in the prior art.

A further benefit of the present teachings is that the reduced length of the bridge 16 means that the bridge arms 18 are shorter, resulting in a stiffer caliper that is more resistant to deflection. The distance of the lever arm between the outboard brake pad 4b and the mounting of the caliper 8 to the carrier 2 is reduced and as such the twisting load that is placed on the guide assembly between caliper and carrier is reduced for an equivalent brake torque. This may permit shorter and lighter guide pins of the guide assembly to be utilised. Further, the pad retainer 24 is shorter than in the prior art and therefore does not require as great a resistance to bending. This means that the mass of the pad retainer may be reduced due to it being shorter and also thinner. As the friction material 26 of the brake pads 4a and 4b is thinner it is less compressible under the clamp load than in the prior art. This means that a shorter stroke of the actuator 11 may be required in order to fully apply the brake, which may result in a more compact caliper housing 114 being achieved. For example, the actuator travel may be reduced to 50 mm instead of 65 mm in the prior art. Finally, the wear adjuster mechanism also does not need to adjust for a greater degree of wear as in the prior art further leading to smaller and lighter components. The cumulative weight savings may result in the disc brake of the present teachings having a mass 5 kg or greater less than the equivalent prior art disc brake of the same diameter and capable of applying the same clamp force.

The present teachings may also enable a greater range of shapes to be used for the support portion 20 of the bridge 16 due the increased packaging space available. This greater freedom may be utilised to optimize the second moment of area of the support portion 20 in an outboard axial direction. FIGS. 3A, 3B and 3C illustrate optimised shapes of the support portion 20 that may be achieved. In FIG. 3A equivalent parts to those shown in FIGS. 1 and 2 are denoted by the same reference numerals labelled 200 greater, whereas in FIG. 3B they are labelled 300 greater and in FIG. 3C 400 greater.

In FIG. 3A it can be seen that the support portion 220 has a C-shaped cross-sectional profile comprising an inboard flange 220a, an outboard flange 220b connected by a web 220c that is in a radially outermost position.

FIG. 3B shows an I-section profile in which the support portion comprises inboard and outboard flanges 320a and 320b connected by a web 320c that is at a radial midpoint of the flanges.

FIG. 3C shows a support portion with a box section profile comprising an inboard flange 420a and an outboard flange 420b connected by a radially outermost web 420c and a radially innermost web 420d.

Referring to FIGS. 3E and 3F, a wheel hub may have a first wheel hub configuration 53a (e.g., North American) or a second wheel hub configuration 53b (e.g., European Union) that differs from the first wheel hub configuration 53a. A wheel rim may have a first rim configuration 51a (e.g., North American) or second rim configuration 51b (e.g., European Union) type that differs from the first rim configuration 51a. The first wheel hub configuration 53a may be provided with a first axle assembly 49a. The second wheel hub configuration 53b may be provided with a second axle assembly 49b. A first disc brake 55a and a second disc brake 55b may be provided with the first and second axle assemblies 49a, 49b, respectively. The first and second disc brakes 55a, 55b may have a common configuration and may both be fittable on the first axle assembly 49a and the second axle assembly 49b.

Although the invention has been described above with reference to one or more preferred embodiments, it will be appreciated that various changes or modifications may be made without departing from the scope of the invention as defined in the appended claims. For example, in other embodiments the disc brake may be electromechanically actuated.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An axle assembly comprising:
    a wheel hub;
    a wheel rim mounted to the wheel hub;
    a brake rotor mounted to the wheel hub;
    an axle; and
    a disc brake that includes:
        a first friction element and a second friction element;
        a brake caliper including a housing and a bridge;
        the housing containing a wear adjustment mechanism and an actuator mechanism having a friction element contacting actuator output to drive the first friction element in a first axial direction; and
        the bridge extending over the brake rotor in use and defining a support face to the second friction element in at least the first axial direction;
        wherein the first friction element and second friction element each have an effective contact area to the brake rotor of at least 10,000 mm$^2$ and wherein a maximum spacing between the actuator output and the support face is in a range of 75 mm to 50 mm; and
    wherein the wheel hub has either a first wheel hub configuration or a second wheel hub configuration that differs from the first wheel hub configuration and the wheel rim has either a first rim configuration or a second rim configuration that differs from the first rim configuration, wherein the first rim configuration is mountable on the first wheel hub configuration but not the second wheel hub configuration and the second rim configuration is mountable on the second wheel hub configuration but not the first wheel hub configuration, and the disc brake does not foul on the wheel hub or wheel rim when the first friction element and the second friction element are unworn and the brake rotor is unworn.

2. The axle assembly of claim 1 wherein the axle assembly is powered at least in part by an electric motor supplied with electrical energy from an electrical energy storage device.

3. The axle assembly of claim 1 wherein the disc brake is rated to provide a brake torque in excess of 8 kNm.

4. The axle assembly of claim 1 wherein the disc brake comprises an opening in the bridge, the opening having an axial length at least as large as the maximum spacing between the actuator output and the support face.

5. The axle assembly of claim 4 wherein the opening of the disc brake has a circumferential width at least as wide as the brake pads so as to permit fitting and removal of the first and/or the second friction element to and from the disc brake in a solely radial direction.

6. The axle assembly of claim 4 wherein a pad retainer extends over the opening of the disc brake to hold the first friction element, the second friction element, or both in place.

7. The axle assembly of claim 1 wherein the bridge of the disc brake comprises a support portion comprising the support face, and wherein the support portion has an I-section, C-section, or box section profile.

8. The axle assembly of claim 1 wherein the housing and the bridge of the disc brake are formed monolithically as a monobloc from a same piece of material.

9. The axle assembly of claim 1 wherein the disc brake further comprises a carrier having support surfaces to support the first friction element and the second friction element in a circumferential and radially inward direction.

10. The axle assembly of claim 9 wherein the carrier of the disc brake has an axial length between an inboard extent of the support surface for the first friction element and an outboard extent of the support surface for the second friction element of less than 100 mm.

11. The axle assembly of claim 1 wherein the disc brake further comprises an actuator, wherein the actuator has a maximum travel of less than 55 mm.

12. The axle assembly of claim 1 wherein the brake rotor is a solid, unventilated rotor.

13. A method of assembling a plurality of axle assemblies, the method comprising:
    providing a first axle assembly that has a first wheel hub having a first wheel hub configuration;
    providing a second axle assembly that has a second wheel hub that has a second wheel hub configuration that differs from the first wheel hub configuration;
    providing a first disc brake and a second disc brake that have a common configuration, wherein the first disc brake and the second disc brake are both fittable on the first axle assembly and the second axle assembly;
    fitting the first disc brake to the first axle assembly and fitting the second disc brake to the second axle assembly;
    providing a first rim that has a first rim configuration and a second rim that has a second rim configuration that differs from the first rim configuration; and
    mounting and securing the first rim to the first wheel hub and mounting and securing the second rim to the second wheel hub, wherein the first rim configuration is mountable on the first wheel hub configuration but not the second wheel hub configuration and the second rim is mountable on the second wheel hub configuration but not the first wheel hub configuration.

* * * * *